Patented June 24, 1930

1,766,063

UNITED STATES PATENT OFFICE

MELVIN DE GROTE, OF ST. LOUIS, AND LOUIS T. MONSON, OF MAPLEWOOD, MISSOURI, ASSIGNORS TO WM. S. BARNICKEL & COMPANY, OF WEBSTER GROVES, MISSOURI, A CORPORATION OF MISSOURI

PROCESS FOR BREAKING PETROLEUM EMULSIONS

No Drawing.     Application filed January 21, 1929. Serial No. 334,112.

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment.

The treating agent employed in our process consists of a substituted sulfonic petroleum body derived by the action of a condensing agent and a sulfonating agent on a petroleum body of the kind subsequently defined, and an alcohol having fewer than 12 carbon atoms.

It is known from German Patent No. 336,558, (1921), that a substituted aromatic sulfonic acid can be produced from an aromatic body and an alcohol by action of a sulfonating agent and a condensing agent. The alcohol most frequently used for this purpose is propyl alcohol. The reaction depends on the formation of the acid sulfate, namely propyl acid sulfate, which, under proper conditions, splits off a hydrogen from the aromatic nucleus, and thus produces the substituted aromatic body which is subsequently sulfonated. Propyl alcohol can be produced by the saponification of propyl acid sulfate. Propyl acid sulfate is obtained not only by the reaction previously recited, but it is also obtained by passing propylene into sulfuric acid. Thus, in the reaction described in the German patent previously referred to, it is possible to replace propyl alcohol by propylene. Likewise, there are available other homologues similar to propylene which will also serve, such as amylene and hexylene. It is to be noted that these materials react with sulfuric acid to give acid sulfates.

In manufacturing or producing the treating agent or demulsifying agent employed in our process we do not contemplate using all kinds of petroleum bodies. Specifically, we do not contemplate using those petroleum bodies that can act as alcohol substitutes to combine with alcohol residues, but they themselves may be employed as alcohol equivalents, in conjunction with a petroleum body of the kind herein defined. Therefore, we disclaim the use of such material as still gas, which contains constituents capable of forming acid sulfates, except in conjunction with petroleum bodies of the kind herein described.

The petroleum material which we use in producing our treating agent is used as a substitute for the aromatic body and not for the alcohol, in a reaction similar to the one described in the German patent previously referred to. We have found that petroleum bodies capable of producing sulfonic acids are capable of having one of the hydrogens of the molecule replaced by an alcohol residue.

We will define our treating agent or demulsifying agent more in detail by stating that it is a substituted petroleum sulfonic body derived from a petroleum body, characterized by being capable of producing a sulfonic acid, condensed with an alcohol residue derived from an alcohol of fewer than twelve carbon atoms. As a petroleum body we can employ any raw or purified oil which is capable of sulfonation to produce a sulfonic acid. Likewise, we can employ any material which is already a sulfonic acid. A suitable material is a petroleum sulfonic acid, such as is obtained by the action of sulfuric acid or oleum on crude petroleum or its fractions, or on material obtained by pyrolytic action, such as liquid material obtained from cracking stills. Another suitable material is the petroleum body obtained by extraction of raw petroleum or other fractions with liquid sulfur dioxide. A desirable raw material may be obtained from the partial oxidation of selected petroleum bodies. A carboxylic material of the designated specification is also satisfactory. Another suitable material is residual oil obtained from cracking stills, which is in essence a mixture of high boiling cyclic bodies similar to aromatic bodies. Briefly, then, the petroleum body employed may be a crude oil or a fraction thereof, or a material derived from a cracking or purifying process, and is adaptable to our purpose, provided it is a sulfonic acid or capable of being converted into a sulfonic body. We do not contemplate the use of petroleum bodies yielding acid sulfates of the type produced by propylene, except in conjunction with petroleum bodies of the described kind.

From the foregoing it will be understood that the treating agent or demulsifying agent employed by our process is obtained by introducing alcohol residues having fewer than twelve carbon atoms each, into petroleum bodies of the kind previously described. It is possible to introduce more than one alcohol residue into the petroleum body. The manner of producing the reaction is to mix the petroleum body and alcohol in the presence of sulfuric acid and raise the mass to an elevated temperature. Usually, a large excess of sulfuric acid is preferable and sometimes oleum or chloro-sulfonic acid must be employed. Sometimes the reaction is accelerated by the presence of a phosphorous body, such as phosphoric acid, phosphorous pentoxide, or phosphorous oxychloride, or such material as aluminum chloride, zinc chloride, or iron powder. Obviously, in a reaction of the kind described more than one sulfonic group can be introduced into the petroleum body. It is not necessary that a single alcohol body be used, but two or more different alcohols may be employed; for instance, methyl alcohol, ethyl alcohol, and butyl alcohol.

It should be understood that this reaction is not limited to the introduction of residues from aliphatic alcohols, but can also be applied to the introduction of a residue from an aromatic alcohol, such as hexahydrophenol. Likewise, aralkyl alcohols may be employed, such as benzyl alcohol, or a cyclic alcohol may be employed, such as cyclobutanol. In the introduction of two or more alcohols, as noted, they need not be of the same kind; for instance, one may be an alkyl alcohol, such as propyl alcohol, and the other may be an aromatic alcohol, such as benzyl alcohol, or the other may be a cyclo-alcohol, such as cyclobutanol. In addition to alcohol residues of the kind described, aldehyde residues, ketone residues, and fatty residues may be introduced.

Another method of producing materials of the kind above described suitable for use in our process, is to employ the well-known Friedel and Craft's reaction for introducing a substitution residue into an aromatic or cyclic body. Methyl alcohol may be converted by the action of a suitable phosphorous halogen compound into a suitable methyl halide such as methyl chloride. This material can be treated with a petroleum body of the kind above described in the presence of anhydrous aluminum chloride to give a substituted petroleum body. Said petroleum body can be subsequently sulfonated to give the substituted petroleum sulfonic acid of the kind described in the preceding procedure. Likewise, the methyl chloride can be treated with a petroleum body of the kind previously referred to and subsequently sulfonated to give the treating agent contemplated by our process. This second procedure, namely, the Friedel and Craft reaction, will not be described in detail, because it is possibly the best known reaction of aromatic chemistry.

A third method of producing our treating agent is to dissolve a petroleum body, such as a petroleum sulfonic acid, in an excess of sulfuric acid or other suitable sulfonating agent, and then introduce into the same some material such as ethylene, propylene, butylene, amylene, hexylene, or higher members of this same series, either as a single substance or as a mixture of two or more.

While various procedures may be employed to produce a treating agent or demulsifying agent suitable for use in our process, we prefer to produce said agent by the following procedure: Two moles of propyl alcohol are mixed with excess sulfuric acid to produce propyl acid sulfate and this mass is then mixed with one mole of a petroleum sulfonic acid in the presence of a large excess of 66° sulfuric acid, at an elevated temperature, if required. The reaction is carried on with the addition of moderate amounts of oleum or chlor-sulfonic acid to produce condensation, if required. The reaction can be accelerated by the presence of a catalyst of the kind described. Said reaction is continued until the two alcohol residues are introduced into the petroleum body. When sulfonation is complete, the mass is diluted with water until an upper layer separates. The upper layer is drawn off and neutralized with any suitable base, such as caustic soda, caustic potash, or ammonia. We prefer to use ammonia.

Our broad idea contemplates the use of various substances or materials to constitute the treating agent employed in the process, but we prefer to use a treating agent that produces an insoluble precipitate with soluble alkaline earth salts. The presence or absence of such precipitate probably depends on the number of sulfonic acid groups introduced into the petroleum body from which the treating agent is formed. Therefore, it is our preference that the reaction be carried on so that the product of the reaction will show insolubility with alkaline earth salts by a suitable test, such as the following: A 1% solution of the reagent is mixed with a 1% solution of magnesium sulfate and heated for 10 to 30 minutes in a water bath just below the boiling point of water, if required. In the test with either the calcium salt or the magnesium salt, a precipitate should be obtained which remains after the mixture is diluted with two times its volume of distilled water.

A material or substance of the kind above described can be employed as an acid mass, to treat a petroleum emulsion, but this is not desirable, due to its corrosive effect. There is no objection to an excess of alkali, if desired. Such material can also be converted into an ester by esterification in the usual manner to produce an aromatic or aliphatic ester, such as the ethyl ester. Some of the esters so produced may be oil-soluble, such as the hexyl ester. The treating agent, when it is ready for use, may be acidic in nature, and the complex substituted aromatic sulfonic group may be united with an acid hydrogen ion, as is the case when the acid itself is employed. When said acidic material is neutralized, the hydrogen ion is replaced by a suitable metallic ion equivalent, such as a true metallic ion or an ammonium radical. In the event that the material is esterified, the hydrogen ion is replaced by an organic radical, such as an ethyl radical. We will refer to the hydrogen ion or its metallic substitute or its organic substitute as the hydrogen ion equivalent.

The form, state or condition of the treating agent at the time it is mixed with or applied to the petroleum emulsion to be treated, may be varied to suit existing conditions. It can be used in substantially anhydrous state or in solutions of any convenient strength. A concentrated solution can be emulsified into oil by agency of any suitable oil-soluble emulsifier, such as calcium oleate. The treating agent can be formed entirely from a material of the kind previously described, or it can be formed from such a material in combination with other well known treating agents for petroleum emulsions of the water-in-oil type, such as water softeners, modified fatty bodies or their soaps, petroleum sulfonic acids or their soaps, or other substances having similar properties.

In practising our process a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored, or introducing the treating agent into a container that holds a sludge obtained from the bottom of an old storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils," the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 5,000 parts of emulsion will usually be found to produce commercially satisfactory results.

Having thus described our invention, what we claim as new and desire to secure by Letters Patent of the United States is:

1. A process for breaking a petroleum emulsion of the water-in-oil type, which consists in subjecting the emulsion to the action of a demulsifying agent containing a petroleum sulfonic body derived from the condensation of a petroleum body, characterized by being capable of producing a sulfonic acid, and an alcohol having fewer than twelve carbon atoms.

2. A process for breaking a petroleum emulsion of the water-in-oil type, which consists in subjecting the emulsion to the action of a water-soluble demulsifying agent containing a petroleum sulfonic body derived from the condensation of a petroleum body, characterized by being capable of producing a sulfonic acid, and an alcohol having fewer than twelve carbon atoms.

3. A process for breaking a petroleum emulsion of the water-in-oil type, which consists in subjecting the emulsion to the action of a water-soluble demulsifying agent containing a water-soluble salt of a petroleum sulfonic body derived from the condensation of a petroleum body, characterized by being capable of producing a sulfonic acid, and an alcohol having fewer than twelve carbon atoms.

4. A process for breaking a petroleum emulsion of the water-in-oil type, which consists in subjecting the emulsion to the action of a water-soluble demulsifying agent containing an ammonium salt of a petroleum sulfonic body derived from the condensation of a petroleum body, characterized by being capable of producing a sulfonic acid, and an alcohol having fewer than twelve carbon atoms.

5. A process for breaking a petroleum emulsion of the water-in-oil type, which consists in subjecting the emulsion to the action of a demulsifying agent containing a petroleum sulfonic body derived from the condensation of a petroleum body, characterized by being capable of producing a sulfonic acid, and an aliphatic alcohol having fewer than twelve carbon atoms.

6. A process for breaking a petroleum emulsion of the water-in-oil type, which consists in subjecting the emulsion to the action of a water-soluble demulsifying agent containing a petroleum sulfonic body derived from the condensation of a petroleum body, characterized by being capable of producing a sulfonic acid, and an aliphatic alcohol having fewer than twelve carbon atoms.

7. A process for breaking a petroleum emulsion of the water-in-oil type, which consists in subjecting the emulsion to the action of a water-soluble demulsifying agent containing a water-soluble salt of a petroleum sulfonic body derived from the condensation of a petroleum body, characterized by being capable of producing a sulfonic acid, and an aliphatic alcohol having fewer than twelve carbon atoms.

8. A process for breaking a petroleum emulsion of the water-in-oil type, which consists in subjecting the emulsion to the action of a water-soluble demulsifying agent containing an ammonium salt of a petroleum sulfonic body derived from the condensation of a petroleum body, characterized by being capable of producing a sulfonic acid, and an aliphatic alcohol having fewer than twelve carbon atoms.

9. A process for breaking a petroleum emulsion of the water-in-oil type, which consists in subjecting the emulsion to the action of a demulsifying agent containing a petroleum sulfonic body derived from the condensation of a petroleum body, characterized by being capable of producing a sulfonic acid, and an aliphatic alcohol having fewer than twelve carbon atoms, and furthermore, characterized by producing a precipitate with an alkaline earth salt.

10. A process for breaking a petroleum emulsion of the water-in-oil type, which consists in subjecting the emulsion to the action of a water-soluble demulsifying agent containing a petroleum sulfonic body derived from the condensation of a petroleum body, characterized by being capable of producing a sulfonic acid, and an aliphatic alcohol having fewer than twelve carbon atoms, and furthermore, characterized by producing a precipitate with an alkaline earth salt.

11. A process for breaking a petroleum emulsion of the water-in-oil type, which consists in subjecting the emulsion to the action of a water-soluble demulsifying agent containing a water-soluble salt of a petroleum sulfonic body derived from the condensation of a petroleum body, characterized by being capable of producing a sulfonic acid, and an aliphatic alcohol having fewer than twelve carbon atoms, and furthermore, characterized by producing a precipitate with an alkaline earth salt.

12. A process for breaking a petroleum emulsion of the water-in-oil type, which consists in subjecting the emulsion to the action of a water-soluble demulsifying agent containing an ammonium salt of a petroleum body, characterized by being capable of producing a sulfonic acid, and an aliphatic alcohol having fewer than twelve carbon atoms, and furthermore, characterized by producing a precipitate with an alkaline earth salt.

13. A process for breaking a petroleum emulsion of the water-in-oil type, which consists in subjecting the emulsion to the action of a demulsifying agent containing a petroleum sulfonic body derived from the condensation of a petroleum body, characterized by being capable of producing a sulfonic acid, and propyl alcohol, and furthermore, characterized by producing a precipitate with an alkaline earth salt.

14. A process for breaking a petroleum emulsion of the water-in-oil type, which consists in subjecting the emulsion to the action of a water-soluble demulsifying agent containing a petroleum sulfonic body derived from the condensation of a petroleum body, characterized by being capable of producing a sulfonic acid, and propyl alcohol, and furthermore, characterized by producing a precipitate with an alkaline earth salt.

15. A process for breaking a petroleum emulsion of the water-in-oil type, which consists in subjecting the emulsion to the action of a water-soluble demulsifying agent containing a water-soluble salt of a petroleum sulfonic body derived from the condensation of a petroleum body, characterized by being capable of producing a sulfonic acid, and propyl alcohol, and furthermore, characterized by producing a precipitate with an alkaline earth salt.

16. A process for breaking a petroleum emulsion of the water-in-oil type, which consists in subjecting the emulsion to the action of a water-soluble demulsifying agent containing an ammonium salt of a petroleum sulfonic body derived from the condensation of a petroleum body, characterized by being capable of producing a sulfonic acid, and propyl alcohol, and furthermore, characterized by producing a precipitate with an alkaline earth salt.

MELVIN DE GROOTE.
LOUIS T. MONSON.